United States Patent [19]
Hofmann

[11] Patent Number: 5,829,739
[45] Date of Patent: Nov. 3, 1998

[54] SUPPORTING AND DISTANCE-CHANGING DEVICE

[75] Inventor: Uwe Hofmann, Selztalstrasse, Germany

[73] Assignee: International Business Machines Corporation, Armonk, N.Y.

[21] Appl. No.: 738,427

[22] Filed: Oct. 25, 1996

[30] Foreign Application Priority Data

Dec. 8, 1995 [DE] Germany ............... 195 45 881.8

[51] Int. Cl.[6] ........................................ B25B 1/20
[52] U.S. Cl. ................. 269/43; 269/45; 269/256; 269/296
[58] Field of Search ................ 269/43, 44, 47, 269/48.1, 48.2, 256, 903, 296

[56] References Cited

U.S. PATENT DOCUMENTS

| 709,873 | 9/1902 | Cobb et al. | 269/296 |
| 1,257,040 | 2/1918 | Steuernagel | 269/256 |
| 1,353,558 | 9/1920 | Avillar | 269/43 |
| 2,170,535 | 8/1939 | Marsden | 269/296 |
| 4,050,685 | 9/1977 | Cox | 269/296 |
| 4,970,772 | 11/1990 | Steere, III | 269/903 |
| 5,330,167 | 7/1994 | Plumb | 269/43 |
| 5,503,173 | 4/1996 | Kudo et al. | 269/296 |
| 5,533,243 | 7/1996 | Asano | 269/903 |

*Primary Examiner*—James G. Smith
*Assistant Examiner*—Lee Wilson
*Attorney, Agent, or Firm*—G. Marlin Knight

[57] ABSTRACT

A device is provided which supports plate-like objects and, while supporting the objects, changes the distance between the objects. The device comprises at least one elongated carrier having movable interconnected spacers. The spacers support the plate-like objects substantially parallel with respect to each other. The spacers can be shifted axially on the carrier between positions between positions of minimum and maximum distance.

20 Claims, 6 Drawing Sheets

SUPPORTING AND DISTANCE-CHANGING DEVICE

FIELD OF THE INVENTION

The present invention relates generally to a device for supporting plate-like objects and for changing the distance between the plate-like objects while being supported on the device. In particular, the invention specifically relates to a device having the form of a mandrel and preferably supports and spaces circular magnetic disks

BACKGROUND OF THE INVENTION

Magnetic disks (disks) are data storage devices with a very high storage capacity and density. A disk having a diameter of about 95 mm can store approximately 400 million characters or bytes. In addition to high storage density, disks must have precise mechanical properties. During use, disks are rotated at a speed of about 5400 revolutions per minute. Consequently, the outer rim of the disk reaches a speed of up to 100 km/h, while a write/read head is positioned only a few ten-thousandths of a millimeter away from the disk surface.

The quality requirements for disks require extreme precision during manufacture and use of statistical process control. During the manufacturing process, disks pass through a large number of chemical and/or mechanical processes, such as cleaning, coating and polishing. During the various stages of the manufacturing process, it is important to firmly support the disks, to be able to equally access both sides of the disks, and to prevent the disks from slipping or touching each other. The ability to simultaneously process multiple disks is also desirable. Therefore, a device is needed which supports a plurality of disks parallel to each other along a common axis so that the manufacturing stages can be performed on all the disks simultaneously. Since the individual stages of the manufacturing process are often performed at different locations, a device is needed that also allows the disks to be transported without contamination or damage.

Often, successive processing stages of the manufacturing process require different distances between the disks. For example, disks may be spaced as closely as possible in a transport container, while other processing stages need a larger spacing between the disks. Typically, to change disk spacing, each individual disk, or every other disk, is picked up either manually or mechanically, and transferred to a special transfer container. The remaining disks are then arranged within the original container at the required spacing. However, a manual transfer can easily cause unwanted static. On the other hand, a mechanical transfer, by a robot for example, involves a high level of technical complexity and expense.

In U.S. Pat. No. 4,779,724, a support structure for circular disks comprising a mandrel interacts with the inner periphery of the circular disks. The diameter of the mandrel is altered between a minimum and a maximum distance. To fix the disks in position at a set distance from each other, the mandrel, while in the "minimum position," is pushed through the inner holes of the disks. The disks lock into equidistantly spaced notches on the mandrel. The mandrel is then expanded to the maximum diameter position. Therefore, the disks are fixed at a set spacing with respect to each other and can be transported to the various stages of the manufacturing process. However, the support structure has a disadvantage because the disks can only be fixed at one set distance with respect to each other at a time. It is not possible to change the distance while the disks are on the mandrel. Another disadvantage is that the supporting device cannot be used for small form factor disks having a small inner hole diameter, less than 48 mm for example.

Another well-known apparatus increases the distance between disks using a scissor parallelogram and a spindle drive. However, the apparatus has disadvantages. One, the apparatus has a very large number of moving and bearing-supported parts. Two, the apparatus can handle a few disks. If the apparatus is used with a large number of disks, the disks at the ends of the apparatus tilt too much and the disks cannot be handled reasonably safely.

SUMMARY OF THE INVENTION

To overcome the disadvantages of the prior art described above, and to overcome other disadvantages that will become apparent upon reading and understanding the present invention, the present invention provides a device for supporting objects and changing the distance between the objects while supporting the objects.

The present invention is a device which supports a plurality of plate-like objects comprising a first elongated carrier element, and a plurality of movably interconnected spacers arranged on the first elongated carrier element. The spacers support the plurality of plate-like objects in a substantially parallel arrangement. The spacers axially move along the first elongated carrier element while supporting the plurality of plate-like objects.

The present invention supports disks such that the disks do not slip or touch each other during various stages of the manufacturing process or during transportation. The present invention also allows the distance between the disks to be changed while the objects are supported. Therefore, the present invention eliminates the need for a complicated transfer of individual disks, either manually or mechanically by robot, when the distance between the individual disks needs to be changed. Consequently, individual disks are less likely to be damaged and the capacity of the manufacturing equipment is better utilized. Moreover, contamination of the disks is minimized.

The invention is not meant to be limited to disks and applies to any object in the form of a thin plate. In a first embodiment, the present invention can handle objects using an inner hole of that object. For example, the present invention can handle objects having an inner hole diameter of at least 18 mm. In a second embodiment, a two carrier device handles objecting using an inner hole of the object. In a third embodiment, objects are handled on the outer edges, and the objects may have various shapes, such as square, rectangular or ellipsoid for example. In the present invention, all the objects being handled should have the same geometry and positioning. Furthermore, the present invention is not meant to be limited to specific operations, and can generally be used where objects need to be supported and the distance between the objects with respect to each other needs to be changed.

DETAILED DESCRIPTION OF THE PREFERRED EMBODIMENTS

A preferred embodiment of the present invention will hereinafter be described with reference to the drawings.

Figure 1:
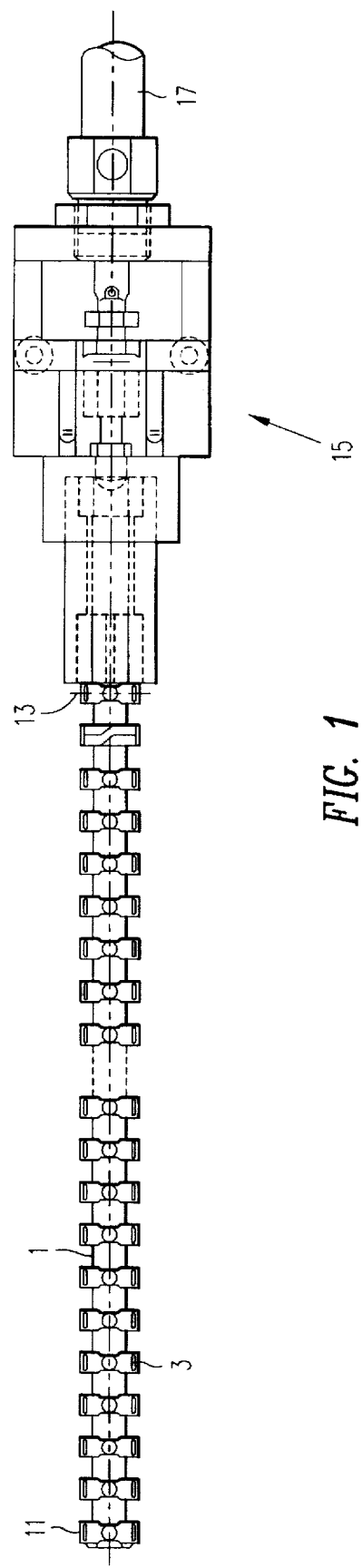
FIG. 1 is a schematic of a first embodiment of the present invention.

Referring to FIG. 1, a schematic of the device of a first embodiment of the present invention is shown. The device comprises a first elongated carrier element (carrier) 1 and spacers 3. The spacers 3 are moveably interconnected and arranged in a row on the elongated carrier 1. The carrier 1 may be a shaft or the like. Preferably, the carrier has a mandrel shape. Preferably, the spacers 3 have a ring shape. However, the spacers may have other shapes, such as rectangular, although the other shapes are less preferable in terms of production engineering. The individual spacers 3 move freely on the carrier 1 and freely move backwards and forwards within certain limits, depending on the specific distance required.

Figure 2:
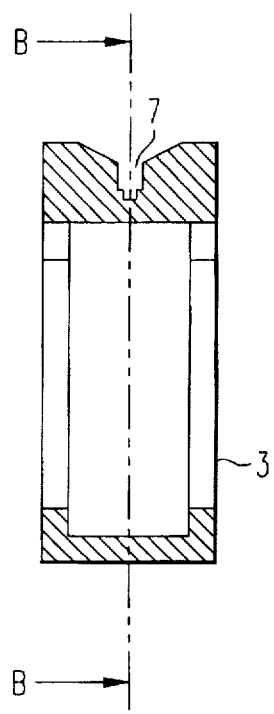
FIG. 2 is a spacer of the first embodiment of the present invention of FIG. 1.

Referring also to FIG. 2, a side view of a spacer 3 of the preferred first embodiment of the present invention of FIG. 1 is shown. Each spacer 3 has a retaining groove 7 or recess at the top. Disks 9 engage the retaining groove 7 when the carrier 1 catches on the inner hole of the disks 9 (see FIG. 4).

Figure 3:
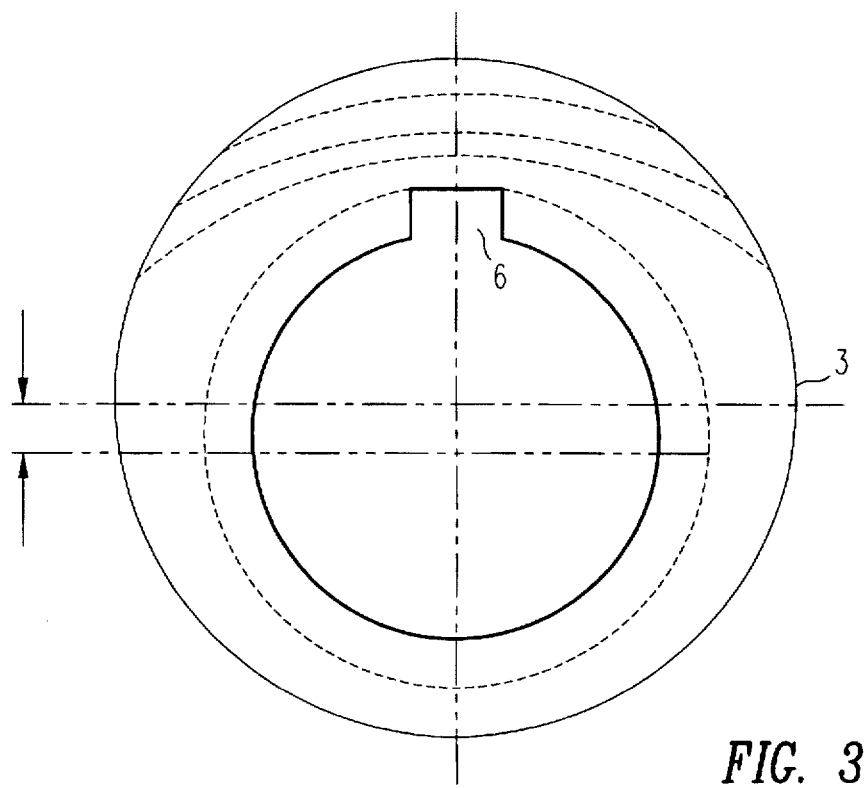
FIG. 3 is a sectional view of the side view of a spacer along the line B—B of FIG. 2.

Referring also to FIG. 3, a sectional view along the line B—B of the spacer of the first embodiment of the present invention is shown. Preferably, the spacers 3 have a circular shape with a circular hole. The center of the circular hole is eccentric or offset with respect to the center of the spacer. Therefore, preferably, the center of the carrier 1 is offset with respect to the center of each spacer 3 by a few millimeters. The top part of the spacer 3 is thicker and has a groove 6 which accommodates a supporting means 5 (FIG. 4), such as a featherkey. Using the supporting means 5, the spacers 3 are secured against twisting around the axis of the carrier 1. Because of the eccentric arrangement, the retaining groove 7 in the top part of the spacer 3 can also be mounted. The preferred circular shape of the spacers 3 supports mounting (assembly) of the disks.

Because the outer dimensions of the individual spacers 3 are freely selectable, the disks 9 can be set at a specific predetermined distance from each other. Consequently, as shown in FIG. 4, the disks can be held at a very close spacing, such as 6.35 mm, typically used for disks in transport containers.

Referring back to FIG. 1, preferably the first spacer 11 is fixed to one end of the carrier 1, while the last spacer 13, at the opposite end of the carrier, is connected by a connecting element 15, such as a slide bushing, to a moving means 17 (partially shown) which allows the individual spacers 3 to shift in relation to each other so that the spacers 3 can be both pushed together and drawn apart. For example, the moving means may be a pneumatic cylinder. However, the invention is not meant to be limited to pneumatic cylinders, and any similar component, such as a spindle, can be used. Alternatively, the last spacer 13 can be fixed to the carrier 1, while the first spacer 11 can move.

Figure 4:
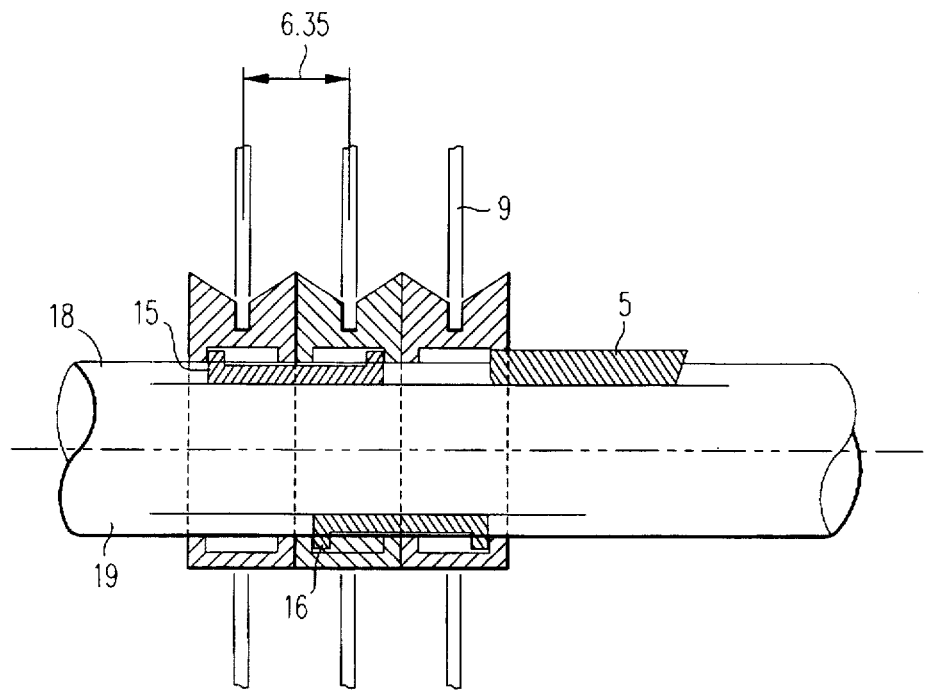
FIG. 4 is a detailed partial view of the first embodiment of the present invention showing the minimum spacing between the disks.
Figure 5:
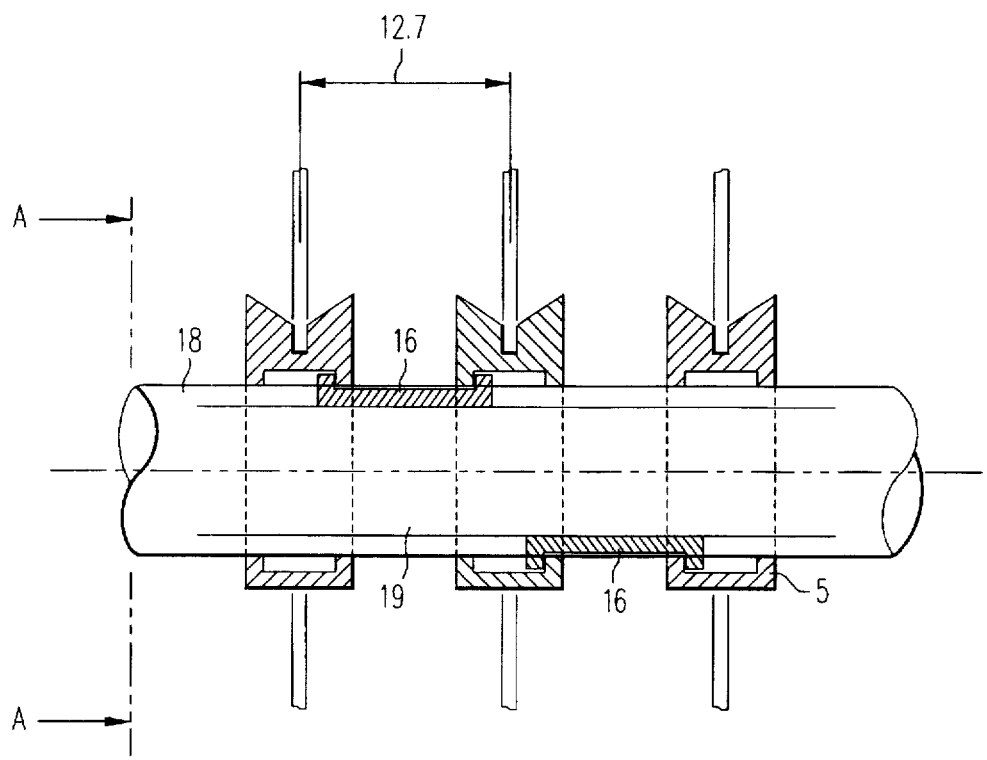
FIG. 5 is a detailed partial view of the first embodiment of the present invention showing the maximum spacing between the disks.

Referring to FIGS. 4 and 5, to enable the spacers 3 to move synchronously when being pushed together or pulled apart (except for the last spacer 13, connected to the moving means 17, and the first spacer, fixed to the carrier 1), the spacers 3 are interconnected by appropriate connecting means 16, such as catch hooks. The hooks 16 are mounted in a groove 18 cut into the carrier 1. It will be apparent to those skilled in the art that other connecting means can also be used. For simplicity, the following description discusses hooks.

When the hooks 16 are drawn apart by the moving means 17, the individual spacers 3 are caught, one after another, by the hooks 16, and therefore are spaced at a correspondingly larger distance. The amount of increase in distance depends on the size of the hooks 16.

Figure 6:
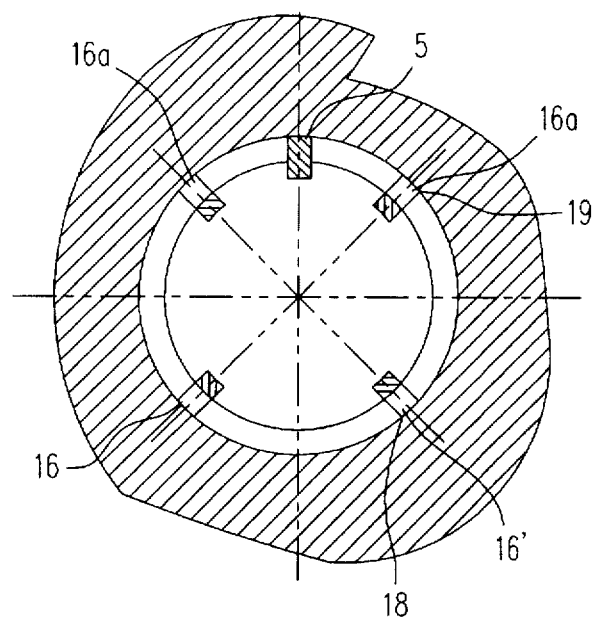
FIG. 6 is a sectional view of the first embodiment of the present invention along the line A—A of FIG. 5.

FIGS. 4 and 5 show a detailed view of the arrangement of the hooks and spacers, when pushed together (FIG. 4) and when drawn apart (FIG. 5). If the hooks 16 are very large, such as when doubling the distance between the disks mentioned earlier from 6.35 mm to 12.7 mm, a problem occurs because not all hooks can be accommodated in one single groove on the carrier 1; if they were, the device would become too large and thus significantly impair the handling capability. Therefore, a second groove 19, offset at an angle of about 45° with respect to the first groove 18, is cut into the carrier 1, and some of the hooks 16a (FIG. 6) are mounted in it. To improve the stability of movement, two additional grooves are also provided in the carrier 1, at an angle of substantially 180° with respect to grooves 18 and 19 respectively.

Figure 7:
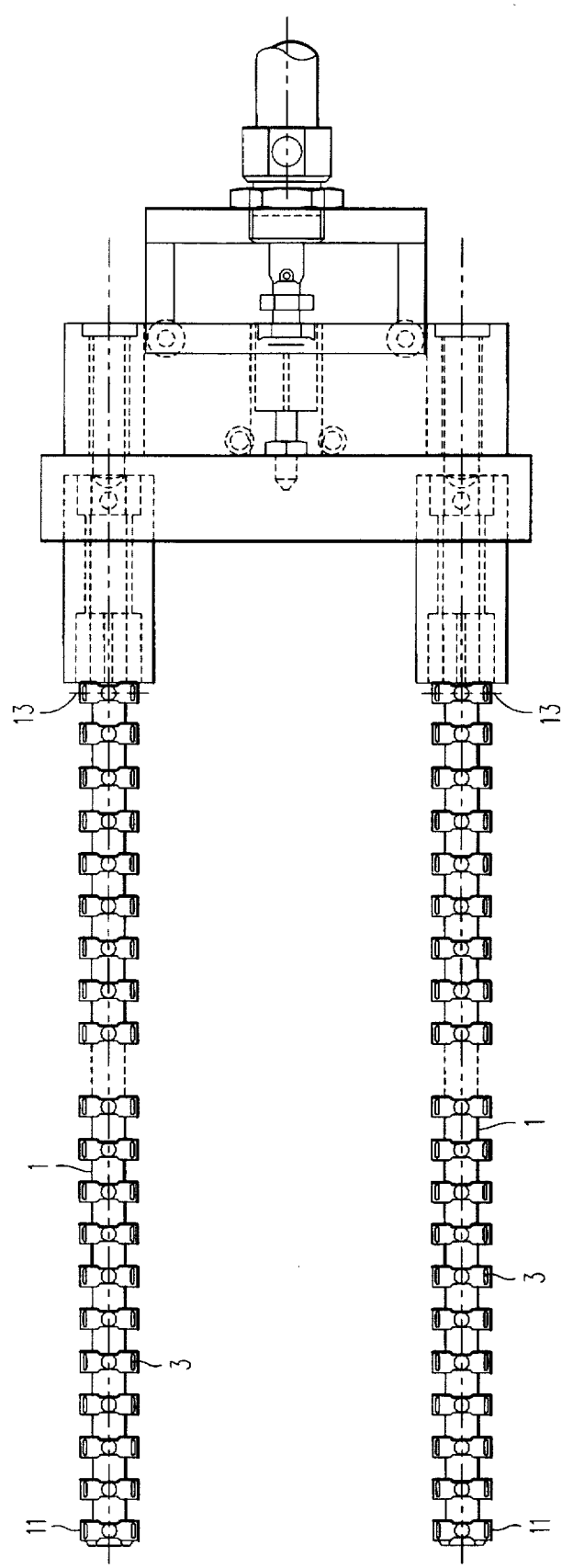
FIG. 7 is a second embodiment of the present invention.

Referring to FIG. 7, a second embodiment of the present invention is shown. In the second embodiment, two carriers 1 are arranged substantially parallel to each other to double the quantity of disks that can be simultaneously processed.

The first and the second embodiments are basically suited to handling disks on the diameter of the inner hole, that is, the disks are picked up by their inner holes. The first and second embodiments can be used with disks having a form factor down to an outer diameter of approximately 65 mm with an approximately 20 mm inner hole diameter. However, smaller form factor disks, for example with an outer diameter of 48 mm or 32 mm and an inner hole diameter of 12 mm or smaller, cannot be picked up by their inner hole.

Figure 8:
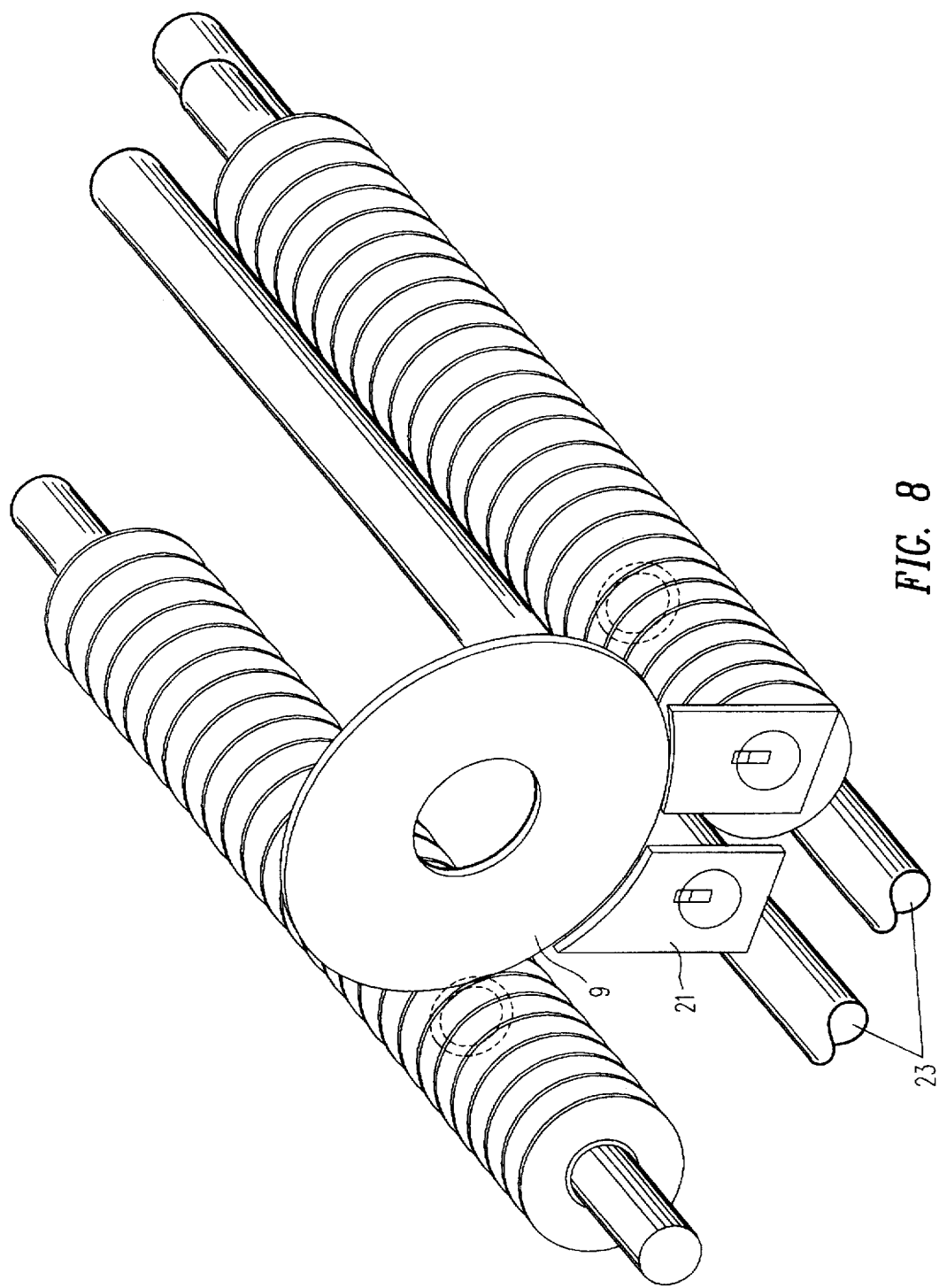
FIG. 8 is a third embodiment of the present invention.

Therefore, in a third embodiment of the present invention, a first assembly, as in FIG. 7, having two carriers 1 in the form of a double mandrel 23 supports the outer diameters of the disks. Referring also to FIG. 8, a second assembly 24 may provide additional support for the outer diameter of a disk 9. On the first assembly 23, the spacers 21 are no longer ring shaped, but are adapted to the outer contour of the supported objects 9. Preferably, the spacers 21 are shaped to handle several disk sizes.

Figure 9:
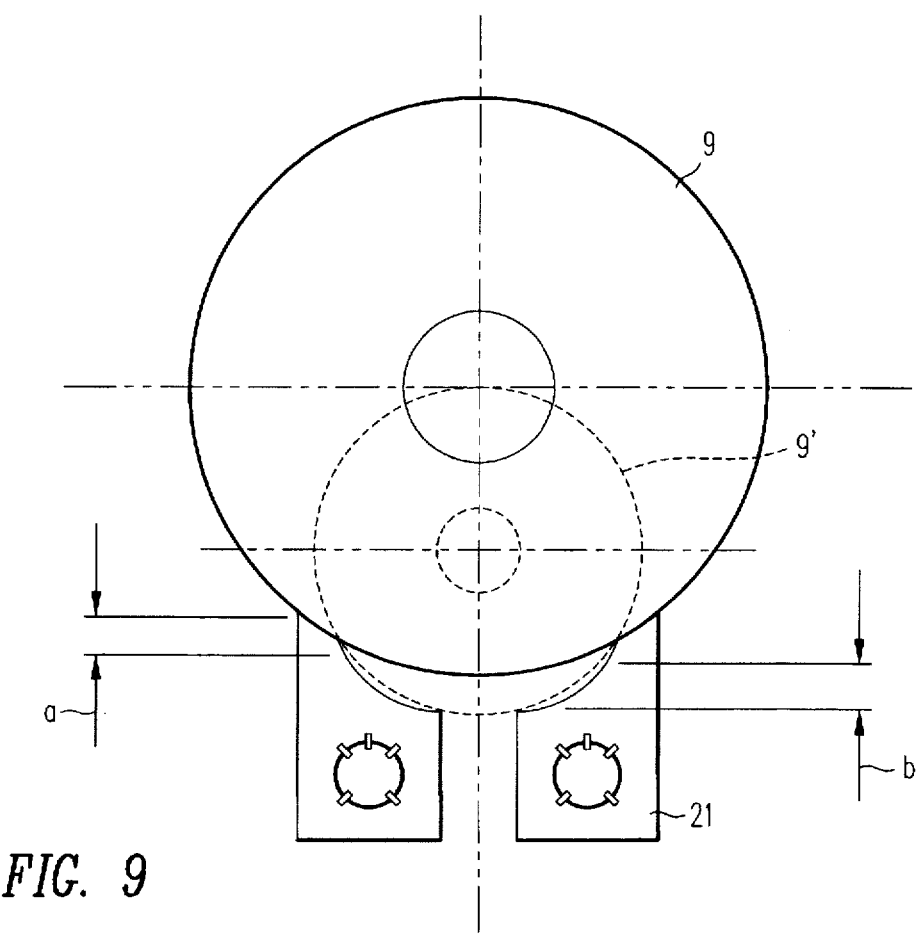
FIG. 9 is an embodiment of a spacer of the third embodiment of the present invention of FIG. 8.

In FIG. 9, an embodiment of the spacer 21 of the first assembly of the third embodiment of the present invention is shown. Dimensions "a" and "b" indicate the vertical support. For example, dimension "a" indicates the vertical support points for a disk 9 having a diameter of 65 mm. A groove with outer diameter of 65 mm is cut into the spacer 21 to hold 65 mm disks 9. Dimension "a" should be made as large as possible, to ensure accurate vertical orientation. To support disks having a diameter different from dimension "a", a second groove, indicated by dimension "b", is cut into the spacer 21. For example, the second groove has an outer diameter of 48 mm to support 48 mm disks 9'. The center of the disks 9' supported by dimension "b" is offset with respect to the center of the disks 9 supported by dimension "a".

Therefore, the device according to the third embodiment of the present invention can be used for two different products, as indicated by disks 9 and 9', without "conversion." Therefore, production flexibility and the service life of the equipment increases.

Therefore, in the present invention, disks can not only be supported by an inner hole, but also by their outer rims, by sufficiently clamping the outer rims of the disk in corresponding grooves, for example. Consequently, the present invention allows the distance between the disks to be changed while the disks are being supported. Therefore, the process for handling disks is simplified. For example, disks can be transferred between containers and processing steps on the same device while changing the spacing between the disks.

I claim:

1. A device for supporting a plurality of plate-like objects comprising:

a first elongated carrier; and a plurality of movably interconnected spacers arranged on the first elongated carrier wherein the spacers move synchronously and axially along the first elongated carrier from at least a first uniform separating distance to a second uniform separating distance, the spacers supporting the plate-like objects with planar surfaces of the plate-like objects held substantially parallel to each other and perpendicular to a long axis of the first elongated carrier.

2. The device as recited in claim 1 wherein the spacers are ring-shaped and the elongated carrier passes through an aperture in each spacer and each spacer has a groove for supporting a plate-like object, such as a disk having a central hole by engaging the disk at the central hole.

3. The device as recited in claim 1 wherein the first elongated carrier is a mandrel.

4. The device as recited in claim 3 wherein the spacers have a central aperture through which the first elongated carrier engages the spacers.

5. The device as recited in claim 1 further comprising a supporting means for securing the spacers on the first elongated carrier.

6. The device as recited in claim 4 wherein the spacers have a retaining groove.

7. The device as recited in claim 1 further comprising a moving means coupled to the first elongated carrier and to the spacers.

8. The device as recited in claim 7 wherein the moving means comprises a pneumatic cylinder.

9. The device as recited in claim 1 further comprising a connecting means for interconnecting the spacers, the connecting means limiting separation of the spacers to the second uniform separating distance.

10. The device as recited in claim 9 wherein the connecting means comprises a plurality of hooks which connect a spacer to an adjacent spacer.

11. The device as recited in claim 10 wherein the first elongated carrier has a first longitudinal groove, and the hooks are mounted in the first longitudinal groove.

12. The device as recited in claim 11 wherein the first elongated carrier has a second longitudinal groove offset at a predetermined angle with respect to the first groove, wherein a portion of the hooks are mounted in the second groove.

13. The device as recited in claim 1 wherein the interconnected spacers move between a minimum distance position where the spacers abut one another and a maximum distance position when the spacers are biased against interconnecting elements, while the objects are supported.

14. The device as recited in claim 1 further comprising a second elongated carrier substantially parallel to the first elongated carrier, wherein the first elongated carrier and the second elongated carrier each have corresponding spacers such that a pair of corresponding spacers supports the plate-like objects on the outer edge of the plate-like objects.

15. The device as recited in claim 14 wherein the spacers are adapted to the outer contour of the plate-like objects.

16. The device as recited in claim 1 wherein the spacers support the plate-like objects on the outer edge of the plate-like objects and are shaped to support at least two different outer contours of the plate-like objects.

17. A device for supporting a plurality of objects comprising:

a mandrel having a longitudinal groove;

a plurality of axially movable spacers, arranged on the mandrel, each spacer having means for holding an object;

interconnection means, mounted in the groove, for movably connecting each spacer to at least one adjacent spacer creating a chain of spacers; and means for locking the chain of spacers in first and second positions, with the second position corresponding to the maximum axial separation distance between adjacent spacers.

18. The device of claim 17 further comprising means for moving the chain of spacers from the first position to the second position.

19. A device for supporting a plurality of disks having an inner hole comprising:

a mandrel having a first groove;

a plurality of spacers, the spacers being movably arranged on the mandrel to move axially along the mandrel, the spacers having a top groove, the spacers having means for attaching an object to the spacer;

a featherkey, engaging the top groove of the spacers, for securing the spacers on the mandrel and for preventing the spacers from twisting on the mandrel;

a first plurality of hooks, mounted in the first groove of the mandrel, movably interconnecting the spacers, for limiting the spacers at a maximum distance position; and means for moving coupled to the mandrel, the hooks and the spacers, and being fixedly attached to a terminal spacer at one end of the mandrel, for moving the spacers axially along the mandrel.

20. The device of claim 19, wherein the mandrel has a second groove, the spacers are circular, having a circular hole offset with respect to the center of the spacers forming a thicker top part, the thicker top part having a retaining groove forming the means for attaching an object to the spacer, a second plurality of hooks are mounted in the second groove of the mandrel, movably interconnecting the spacers, and the means for moving comprises a pneumatic cylinder.

* * * * *